US008695005B2

(12) United States Patent
Bowers et al.

(10) Patent No.: US 8,695,005 B2
(45) Date of Patent: Apr. 8, 2014

(54) MODEL FOR HOSTING AND INVOKING APPLICATIONS ON VIRTUAL MACHINES IN A DISTRIBUTED COMPUTING ENVIRONMENT

(75) Inventors: Stuart M. Bowers, Redmond, WA (US); Brandon T. Hunt, Bellevue, WA (US); Thomas E. Jackson, Redmond, WA (US); Chris Demetrios Karkanias, Sammamish, WA (US); Brian S. Aust, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 543 days.

(21) Appl. No.: 12/975,365

(22) Filed: Dec. 22, 2010

(65) Prior Publication Data

US 2012/0167108 A1 Jun. 28, 2012

(51) Int. Cl.
*G06F 9/46* (2006.01)
*G06F 9/455* (2006.01)
*G06F 15/173* (2006.01)

(52) U.S. Cl.
USPC ............... 718/103; 718/102; 718/1; 709/201; 709/226

(58) Field of Classification Search
None
See application file for complete search history.

(56) References Cited

U.S. PATENT DOCUMENTS

| 5,774,668 | A | * | 6/1998 | Choquier et al. | 709/223 |
|---|---|---|---|---|---|
| 7,594,228 | B2 | * | 9/2009 | Lam | 718/102 |
| 7,752,622 | B1 | * | 7/2010 | Markov | 718/103 |
| 8,250,548 | B2 | * | 8/2012 | Kasahara et al. | 717/149 |
| 8,458,700 | B1 | * | 6/2013 | Arrance et al. | 718/1 |
| 2007/0283358 | A1 | * | 12/2007 | Kasahara et al. | 718/104 |
| 2009/0300210 | A1 | | 12/2009 | Ferris | |
| 2010/0094828 | A1 | * | 4/2010 | Mehta et al. | 707/705 |
| 2011/0010343 | A1 | * | 1/2011 | Chavda et al. | 707/637 |
| 2011/0173038 | A1 | * | 7/2011 | Moon et al. | 705/7.12 |
| 2011/0173626 | A1 | * | 7/2011 | Chi et al. | 718/103 |
| 2012/0023501 | A1 | * | 1/2012 | Chi et al. | 718/103 |
| 2012/0047239 | A1 | * | 2/2012 | Donahue et al. | 709/220 |
| 2012/0066020 | A1 | * | 3/2012 | Moon et al. | 705/7.28 |
| 2012/0096470 | A1 | * | 4/2012 | Bartfai-Walcott et al. | 718/103 |
| 2012/0131591 | A1 | * | 5/2012 | Moorthi et al. | 718/104 |
| 2012/0191661 | A1 | * | 7/2012 | Chavda et al. | 707/661 |

OTHER PUBLICATIONS

Peha et al, "A Cost-Based Scheduling Algorithm to Support Integrated Services", IEEE, 1991, p. 0741-0753.*
Peha et al, "Cost-Based Scheduling and Dropping Algorithms to Support Integrated Services", IEEE, February 1996, p. 192-202.*
Kim, et al., "Task-aware Virtual Machine Scheduling for I/O Performance", Retrieved at <<http://camars.kaist.ac.kr/~hjukim/vee09.pdf>>, Mar. 11, 2009, pp. 10.

(Continued)

*Primary Examiner* — Abdullah Al Kawsar
(74) *Attorney, Agent, or Firm* — Damon Rieth; Jim Ross; Micky Minhas

(57) ABSTRACT

The described method/system/apparatus uses intelligence to better allocate tasks/work items among the processors and computers in the cloud. A priority score may be calculated for each task/work unit for each specific processor. The priority score may indicate how well suited a task/work item is for a processor. The result is that tasks/work items may be more efficiently executed by being assigned to processors in the cloud that are better prepared to execute the tasks/work items.

20 Claims, 5 Drawing Sheets

(56) References Cited

OTHER PUBLICATIONS

Kim, et al., "Guest-Aware Priority-Based Virtual Machine Scheduling for Highly Consolidated Server", Retrieved at <<http://www.cs.binghamton.edu/~jianwang/pdf/Guest_aware_Scheduling.pdf>>, 2008, pp. 285-294.

Lee, et al., "Supporting Soft Real-Time Tasks in the Xen Hypervisor", Retrieved at <<http://osinside.net/mlee/softrt_xen_minlee.pdf>>, Mar. 17, 2010, pp. 97-108.

Lagar-Cavilla, et al., "SnowFlock: Rapid Virtual Machine Cloning for Cloud Computing", Retrieved at <<http://chinacloud.cn/upload/2009-04/temp_09043010242315.pdf>>, Apr. 1, 2009, pp. 12.

Pandey, et al., "Scheduling Data Intensive Workflow Applications based on Multi-Source Parallel Data Retrieval in Distributed Computing Networks", Retrieved at <<http://www.cloudbus.org/reports/MultiDataSourceWorkflowCloud2010.pdf>>, Sep. 16, 2010, pp. 33.

Calheiros, et al., "CloudSim: A Novel Framework for Modeling and Simulation of Cloud Computing", Retrieved at <<http://arxiv.org/ftp/arxiv/papers10903/0903.2525.pdf>>, 2009, pp. 9.

* cited by examiner

FIGURE 5

| | new | wt | deploy | wt | wait | wt | res. | wt | total |
|---|---|---|---|---|---|---|---|---|---|
| Task A | 24 | 1.0 | 24 | 1.0 | 24 | 1.0 | 23 | 1.0 | 95 |
| Task C | 20 | 1.0 | 24 | 1.0 | 25 | 1.0 | 20 | 1.0 | 89 |
| Task E | 18 | 1.0 | 22 | 1.0 | 20 | 1.0 | 22 | 1.0 | 82 |
| Task F | 17 | 1.0 | 21 | 1.0 | 21 | 1.0 | 20 | 1.0 | 79 |
| Task B | 20 | 0.0 | 20 | 0.0 | 40 | 0.75 | 15 | 1.0 | 45 |
| Task D | 20 | 1.0 | 25 | 0.0 | 26 | 0.0 | 45 | 0.0 | 20 |

MODEL FOR HOSTING AND INVOKING APPLICATIONS ON VIRTUAL MACHINES IN A DISTRIBUTED COMPUTING ENVIRONMENT

BACKGROUND

In the past, computing applications have often operated on a single device. The application would be stored on a local hard drive and accessed when needed. This required every computer to have a hard drive and a copy of the application. Accessing application and data remotely was a challenge as the data was almost always stored on the local hard drive which rarely was available remotely. Efficiency problems also existed as users often had significantly more processing power than necessary to operate most applications meaning a significant portion of available processing power sat idle for a majority of the time.

Recently, more and more applications have been moved to a distributed application model, also known as "the cloud." In the cloud, a plurality of processors, which may be part of a computing device such as a server, are accessed over a network. Applications may operate on processors in the cloud and a lite client on the local computing device may display a user interface to a user. The bulk of the processing may occur on the processors in the cloud.

Traditionally, in the cloud, tasks or work items are executed on a first in, first out (FIFO) type of manner. While such an approach assures that a task/work item does not wait too long to be executed, the efficiency of FIFO as applied to tasks/work items is low as processors often have to switch applications, load new applications, switch resources, access new resources, etc. to execute the variety of items that are sent to the cloud.

SUMMARY

The described method/system/apparatus uses intelligence to better allocate tasks/work items among the processors and computers in the cloud. Tasks/work items that are communicated to the cloud contain a summary of the task. The summaries are read and used to assign the task/work item to the processor that can most efficiently handle the task/application. A priority score may be calculated for each task/work unit for each specific processor. The priority score may indicate how well suited a task/work item is for a processor. The priority score may be determined by looking at a variety of costs such as a cost to switch from one function to another function required by a task in the queue, a deployment cost that indicates a cost of deploying an additional function required by a task in the queue, a switching cost that indicates a cost of switching the last executed function to the newly deployed function required by a task in the queue and a wait cost that indicates a cost of leaving the task in the queue.

The result is that tasks/work items may be more efficiently executed by being assigned to processors in the cloud that are better prepared to execute the tasks/work items.

DESCRIPTION OF THE FIGURES

FIG. 5 illustrates how weights may be applied to different costs to determine the priority score for a task for each processor.

SPECIFICATION

Figure 1:
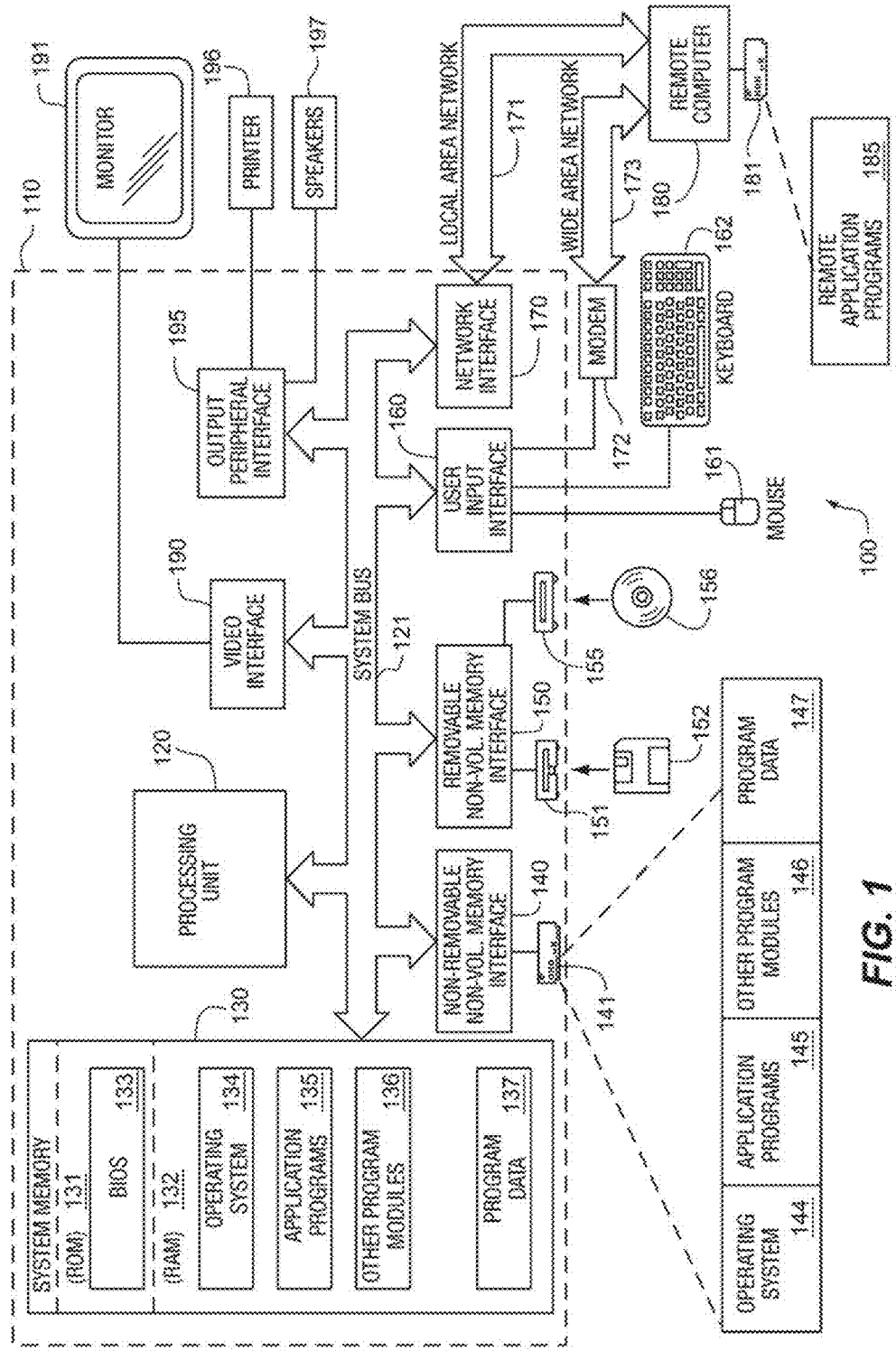
FIG. 1 illustrates a sample computing device that may be physically configured according to computer executable instructions.

FIG. 1 illustrates an example of a suitable computing system environment 100 that may be physically configured to operate, display device and provide a user interface described by this specification. It should be noted that the computing system environment 100 is only one example of a suitable computing environment and is not intended to suggest any limitation as to the scope of use or functionality of the method and apparatus of the claims. Neither should the computing environment 100 be interpreted as having any dependency or requirement relating to any one component or combination of components illustrated in the exemplary operating environment 100. In one embodiment, the device described in the specification is entirely created out of hardware as a dedicated unit that is physically transformed according to the description of the specification and claims. In other embodiments, the device executes software and yet additional embodiment, the device is a combination of hardware that is physically transformed and software.

With reference to FIG. 1, an exemplary system that may be physically configured for implementing the blocks of the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120.

The computer 110 may operate in a networked environment using logical connections to one or more remote computers, such as a remote computer 180, via a local area network (LAN) 171 and/or a wide area network (WAN) 173 via a modem 172 or other network interface 170. In addition, not all the physical components need to be located at the same place. In some embodiments, the processing unit 120 may be part of a cloud of processing units 120 or computers 110 that may be accessed through a network.

Computer 110 typically includes a variety of computer readable media that may be any available media that may be accessed by computer 110 and includes both volatile and nonvolatile media, removable and non-removable media. The system memory 130 may include computer storage media in the form of volatile and/or nonvolatile memory such as read only memory (ROM) 131 and random access memory (RAM) 132. The ROM may include a basic input/output system 133 (BIOS). RAM 132 typically contains data and/or program modules that include operating system 134, application programs 135, other program modules 136, and program data 137. The computer 110 may also include other removable/non-removable, volatile/nonvolatile computer storage media such as a hard disk drive 141 a magnetic disk drive 151 that reads from or writes to a magnetic disk 152, and an optical disk drive 155 that reads from or writes to an optical disk 156. The hard disk drive 141, 151, and 155 may interface with system bus 121 via interfaces 140, 150. However, none of the memory devices such as the computer storage media are intended to cover transitory signals or carrier waves.

A user may enter commands and information into the computer 20 through input devices such as a keyboard 162 and pointing device 161, commonly referred to as a mouse, trackball or touch pad. Other input devices (not illustrated) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device may also be connected to the system bus 121 via an interface, such as a video interface 190. In addition to the monitor, computers may also include other peripheral output devices such as speakers 197 and printer 196, which may be connected through an output peripheral interface 190.

In additional embodiments, the processing unit 120 may be separated into numerous separate elements that may be shut down individually to conserve power. The separate elements may be related to specific functions. For example, an electronic communication function that controls wi-fi, Bluetooth, etc, may be a separate physical element that may be turned off to conserve power when electronic communication is not necessary. Each physical elements may be physically configured according to the specification and claims described herein.

Further, and related to the claims herein, the computer 110 may be part of a distributed computer network or cloud where multiple processors 120 and computers 110 are available to process tasks or work items. From a user perspective, the task is simply completed and there is little concern or indication that tasks are being distributed across a variety of processors 120. All of the computers are likely able to execute tasks for any of the multitude of applications, but some processors may have specific applications already loaded. As a result, it will likely be more efficient for the computers with a specific application loaded to take on additional tasks related to the specific application as switching applications takes time and is inefficient. The distributed computers 110 may be in a single location such as server farm or may be in different geographic locations. The computers 110 may be connected via a network which may be wired or wireless. Tasks make be communicated to and from the processor 120 using the network which, again, may be wired or wireless.

Figure 2:
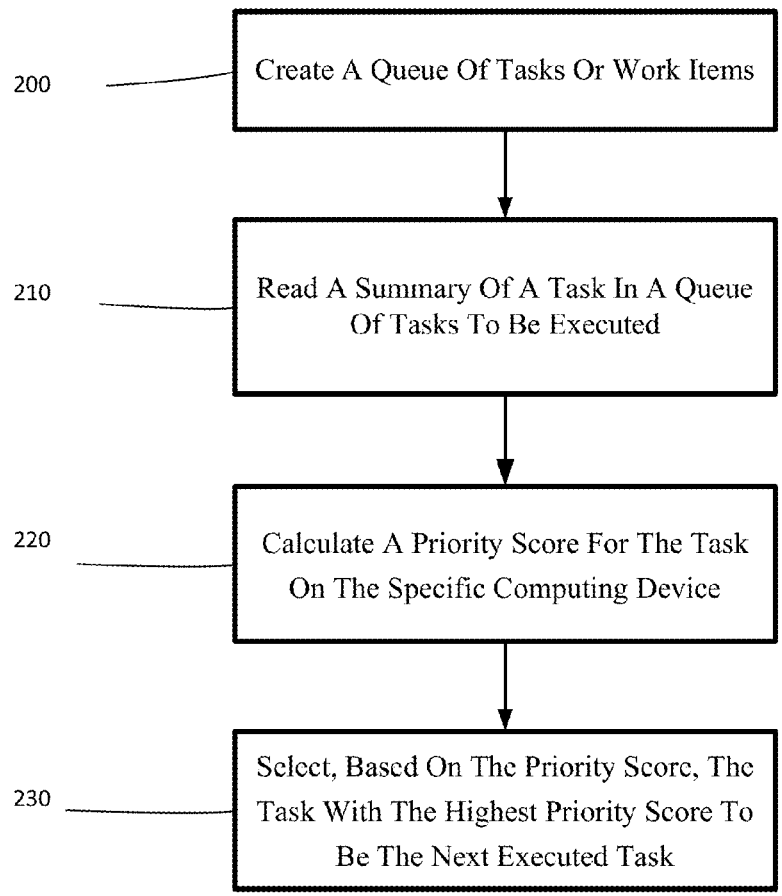
FIG. 2 illustrates steps that are executed by the physically configured computing device to assign the tasks/work items to the optimal processor.

FIG. 2 may illustrate a method of efficiently selecting a task from a queue of tasks to be executed in a distributed computing environment by a specific computing device in a cloud of computing devices. A mentioned previously, all the processors 120 is a distributed network of processors may be able to execute any computing task. However, the time to execute the task may be longer for certain processors 120 as some other processors 120 may already have a needed application loaded and stored in memory. Logically, tasks that require an application that is already loaded into a processor's memory will likely be executed faster on that processor rather than on a processor that would have to find and loaded the necessary application into a memory. Rather than an idle processor simply taking the first task off of a stack of tasks waiting to be executed, the described method/system/device may use intelligence to rank the tasks and execute the tasks on the optimal processor.

Figure 3:
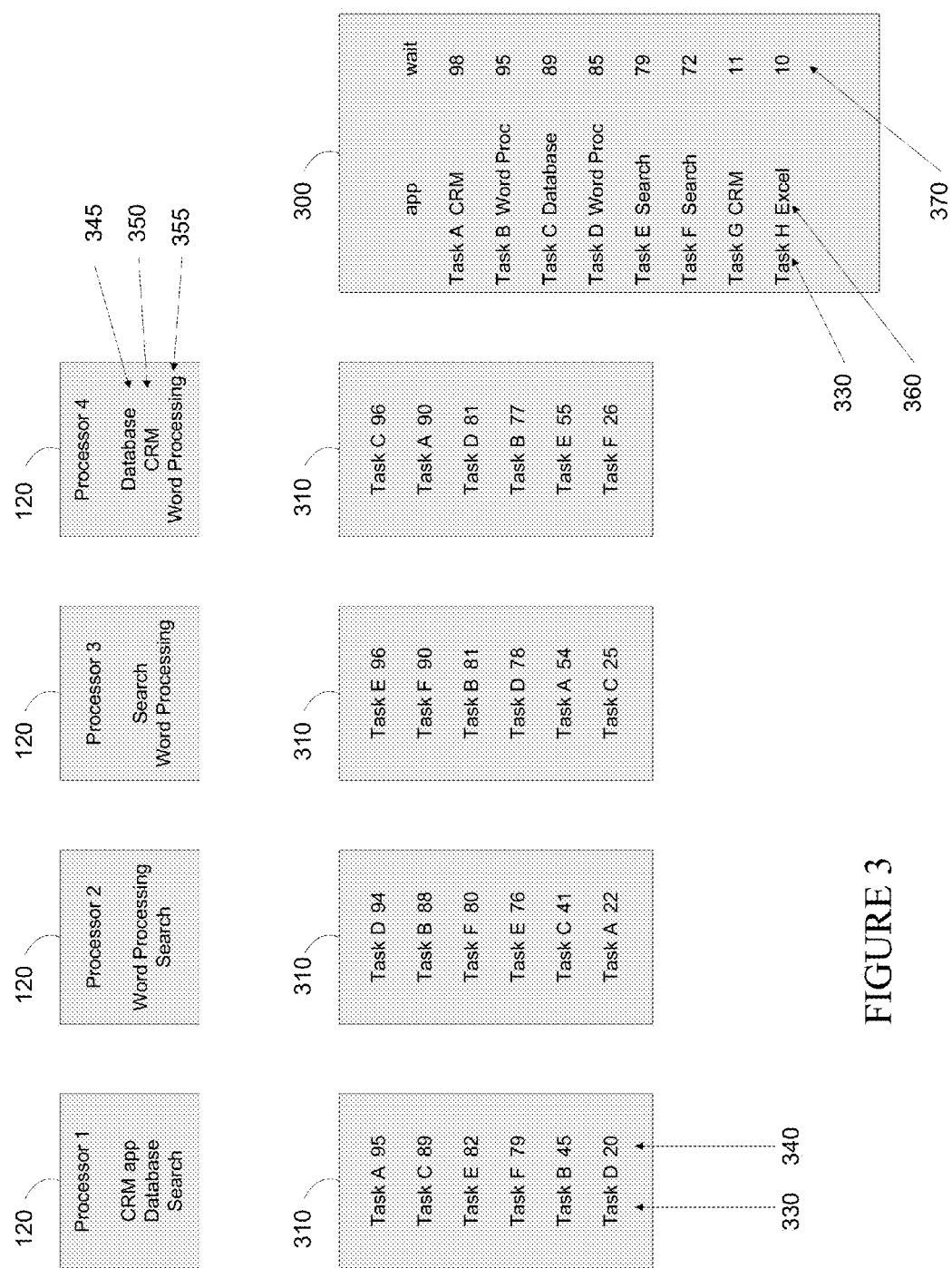
FIG. 3 illustrates how a queue for each processor may be filled using a priority score.

At block 200, a queue of tasks or work items 310 may be created to be executed in a distributed computing environment for a specific computing device 110. FIG. 3 may illustrate a depiction of four processors 120 in the distributed computing environment, along with the work queue 300 and the queue for each processor 310. Of course, there may be more or less processors 120 depending on the embodiment. In most modern queues, the tasks or work items 330 are in order of when they are received. In FIG. 3, the third column 370 may indicate how long the task/work item 330 has been in the queue 300 with the task/work items 330 that have been in the queue 300 for the longest time being on top and usually being the next to be assigned to a processor 120.

At block 210, a summary 360 of a task in a queue of tasks 300 to be executed by one of a plurality of computing devices 110 may be read. The read may be made by a supervisory processor/application 400 (FIG. 4) or may be made by each individual processor 120 or by a combination of both. If there is a supervisory processor/application 400, the supervisory processor/application 400 may also track the applications 345 350 355 and resources in use in each processor 120.

The summary 360 may have information relevant to efficiently assigning the task/work 330 item to a processor 120. In FIG. 3, the summary 360 may list the type of application that the task/work item 330 is related. In other embodiments, the summary 360 may be even more specific and yet other embodiments, the summary 360 may be even broader. In certain embodiments, feedback may be used from the processors 120 to the calling applications such that the summary 360 may call for the specific processor 120 that has executed the most recent tasks/work 330 items from the application.

Evaluating the entire work queue 300 may be an overwhelming task that may not lead to additional efficiency. In some embodiments, only a portion of the work queue is reviewed such as the older portion of the queue such as portion of the work queue that has waited more than 50 time periods (Tasks A-F in FIG. 3). If the entire work queue 300 is small or the speed at which tasks/work items 330 are added to the queue 300 is slow, the entire queue 300 may be reviewed. If the queue 300 is large or tasks/work items 330 are rapidly being added to the queue 300, then a portion of the queue 300 may be reviewed.

At block 220, a priority score 340 for the task 330 on the specific computing device 110 or processor 120 may be calculated. The priority score 340 may be an indication of the relative priority of the task/work item 330 in comparison to additional tasks/work items 330 in the queue 310 for that specific computing device. As an example, Processor 4 (120) in FIG. 3 may have a Database application 345, a CRM application 350 and a Word Processing Application 355 already loaded. Thus, Processor 4 (120) may be efficient at executing database tasks as the database application 345 may be already loaded into a memory in close communication with the processor 120. Thus the priority score 340 for items in the work queue for Processor 4 may be different than the priority score 340 for items in the Processor 3 which may have search functions readily available.

In one embodiment, a new function cost 510 (FIG. 5) is calculated. The new function cost 510 may represent a cost to switch from one function to another function required by a task/work item 330 in the queue. For example, a CRM function may already be loaded and a search function may already be loaded but the CRM function is currently operating. It takes time to switch from the CRM system to the search function. The time required to switch may be larger than waiting for a processor 120 that already has a queue but has the search function already loaded. The new function cost 510 may be evaluated to determine the priority score 340. In addition, the new function cost 510 may be one of many factors that are used to create the priority score 340.

In another embodiment, calculating the priority score 340 for the task/work item 330 on the specific computing device 120 may include calculating a deployment cost 520. The deployment cost 520 may represent a cost of deploying an additional function required by a task 330 in the queue. For example, loading data to execute a Customer Relationship Management (CRM) system search may take a significant amount of time if the CRM system is large. The time required to load in the CRM data may be larger than waiting for a processor 120 that already has a queue but has the CRM data. The new deployment cost 520 may be evaluated to determine the priority score 340. In addition, the deployment cost 520 may be one of many factors that are used to create the priority score 340.

In yet another embodiment, calculating the priority score 340 for the task 330 on the specific computing device 120 may include calculating a wait cost 530. The wait cost 530 may include a cost of leaving the task in the queue 300. For example, the work queue 300 may contain a Enterprise Resource Planning (ERP) application. Perhaps one of the processors 120 has the ERP function loaded but that processor 120 also may have a long queue as the processor 120 may be busy servicing a large search quest. In a traditional First In, First Out (FIFO) system, the ERP function may rise to the top of the queue based solely on its wait time and interrupt the search application execution on the processor 120. In the pending system, the ERP function may be asked to wait until the search function is complete. However, this wait cost 530 may have a cost and the cost may be determined.

The wait cost 530 may determine by a mathematical function such as a linear function, a logarithmic function, an exponential function etc. In another embodiment, a lookup table may be used to assign a cost based on how long the task/work item was in the queue. Of course other methods of calculating the wait cost 530 are possible and are contemplated. The waiting cost 530 may be evaluated to determine the priority score 340. In addition, the waiting cost 530 may be one of many factors that are used to create the priority score 340.

In yet another further embodiment, calculating the priority score 340 for the task 330 on the specific computing device 120 may include calculating a resource requirement cost 540. The resource requirement cost 540 may include a cost of the amount of resources required to process the task/work item 330. As an example, a DNA prediction application may require large amount of memory to load in a DNA sequence. The resource requirement cost 540 for the DNA prediction algorithm may be high. At the same time, a calculator application may require little memory and may have a low resource requirement cost. The resource requirement cost 540 may be evaluated to determine the priority score 340. In addition, the resource requirement cost 540 may be one of many factors that are used to create the priority score 340.

In some embodiments, all the costs of a task/work unit may be evaluated together to determine a priority score 340. In some embodiments, each of the task/work items may be given a weight 550 to calculate the priority score 340. In some embodiments, the weight 550 of a cost 510 520 530 540 may be zero, meaning that cost is ignored entirely. In addition, the weight 550 of a cost of a task/work unit 330 may be modified by a user, or by the system. For example, if a user has a critical task 330 to complete, the weights 550 may be adjusted to ensure that the critical task 330 is completed first. The weights 550 may adjust be adjusted through feedback such as if an application is forced to wait, or even crash because a task/unit of work 330 was not completed timely, the weights 550 may be adjusted to ensure the wait or crash of the application using the task 330 does not occur again.

At block 230, based on the priority score 340, the task 330 with the highest priority score 340 to be the next executed task may be selected by the specific computing device 120. More specifically, the specific processor 120 may request from the work queue 300 that the tasks/work items 330 with the highest priority score 340 for the specific processor 120 be assigned to the specific processor 120. In this embodiment as illustrated in FIG. 3, each processor 120 evaluates the work queue 300 and selects the tasks/work items 330 that appear most appropriate for that processor 120. In one embodiment, the processor 120 compares its priority score 340 for a task/work 330 unit to that of each processor 120 and selects those where it has the highest priority score 340. In another embodiment, the process selects the items in the work group queue 300 that have a priority score 340 that are above a threshold. In some cases, such an arrangement may create a race, such as when two processors 120 have the same priority score 340. In such cases, the first processor 120 to the work queue 300 may win or the conflict may be overcome in any traditional manner.

Figure 4:
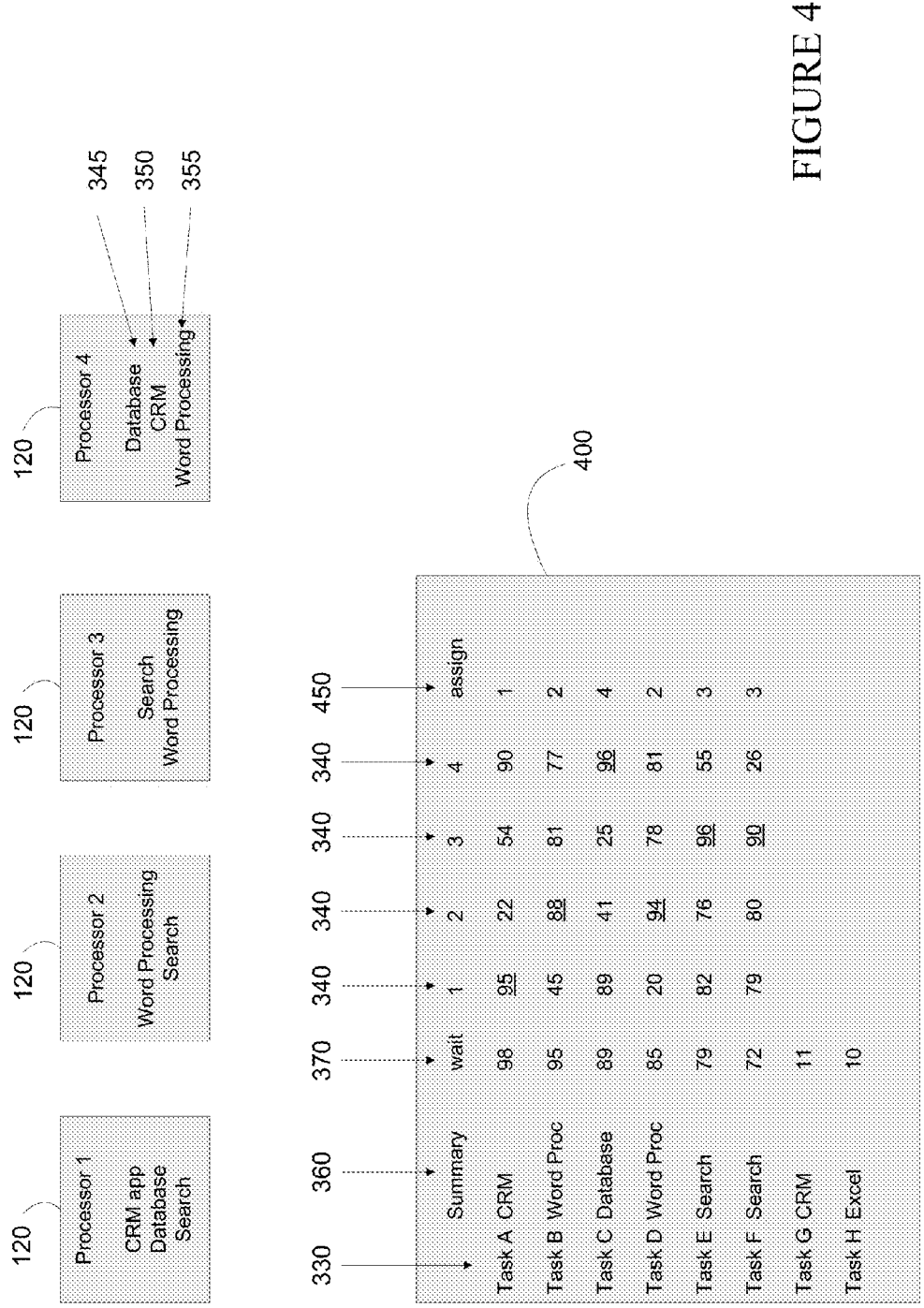
FIG. 4 illustrates how a central processor or application may assign and push task/work items to specific processors.

In another embodiment such as illustrated in FIG. 4, a central processor or application 400 may be configured to be a "central traffic cop" and may track the applications 330 on the processors 120 and the needs in the queue 300. In some embodiments, the central processor evaluates the priority score 340 for each task/work unit 330 and pushes the task/work item 330 to the assigned 450 processor 120. In this way, the central processor 400 may identify appropriate tasks/units of work 330 and "push" them to the appropriate processor 120. The appropriate task/work unit 330 may be task/unit of work 330 that has the highest priority value 340 for the given processor 120 based on one or more of the costs described above.

In additional aspect of the claims, even the processors 120 themselves can accommodate multiple tasks/work 330 items at one time. For example, an existing task/work item 330 may be executed while deploying another task/work item 330 within the specific computing device 120. Similarly, multiple tasks/work items 330 may be executed simultaneously within the specific computing device 120. Likewise, where an existing task/work item 330 does not fully consume a specific computing device 120 resources, additional tasks may be claimed and initiated on that device 120. For example, one computing device 110 may have four processors 120. A task/work item 330 may only require one processor 120, leaving three processors 120 available to work only other tasks/work items 120.

In operation, the benefits of the claimed method/system/apparatus is that the computing devices 110 in a distributed computing system may work together seamlessly and efficiently to assign task/work units. The result will be a more efficient system.

The invention claimed is:

1. A method of selecting a task from a queue of tasks to be executed in a distributed computing environment by one of a plurality of computing devices, the method comprising:

reading a summary of the task in the queue of tasks, the summary listing an application type related to the task;

calculating a priority score for the task to be executed on each of the plurality of computing devices based at least in part on the application type related to the task, wherein each of the calculated priority scores comprises an indication of a relative priority of the task for each of the plurality of computing devices in comparison to additional tasks in the queue, wherein calculating the priority score includes:

calculating a new function cost for the specific computing device wherein the new function cost comprises a cost to switch from one function to another function required by the task in the queue;

calculating a deployment cost for the specific computing device wherein the deployment cost comprises a cost of deploying an additional function required by the task in the queue;

calculating a switching cost for the specific computing device wherein the switching cost comprises a cost of switching from a last executed function to a newly deployed function required by the task in the queue;

calculating a wait cost for the specific computing device wherein the wait cost comprises a cost of leaving the task in the queue; and evaluating the new function cost, the deployment cost, the switching cost and the wait cost to determine the priority score for the task on the specific computing device; and based on the calculated priority scores, assigning the task to be executed by a specific computing device with a highest priority score among the plurality of computing devices.

2. The method of claim 1, wherein calculating the new function cost comprises:

calculating a cost based on a time required to switch from one function to another function required by the task in the queue.

3. The method of claim 1, wherein calculating the deployment cost comprises:

calculating a cost based on a time required of deploying an additional function required by the task in the queue.

4. The method of claim 1, wherein calculating the wait cost comprises:

calculating a cost based on a wait time of leaving the task in the queue.

5. The method of claim 1, wherein:

evaluating the new function cost, the deployment cost, the switching cost and the wait cost includes evaluating the new function cost, the deployment cost, the switching cost and the wait cost with a corresponding weight for each of the new function cost, the deployment cost, the switching cost and the wait cost; and the method further includes adjusting at least one of the weights to avoid a crash of an application associated with the task.

6. The method of claim 1, further comprising executing an existing task while deploying another task within the specific computing device.

7. The method of claim 6, further comprising executing multiple tasks simultaneously within the specific computing device.

8. The method of claim 7, wherein if the existing task does not fully consume a specific computing device resource, initiating additional tasks in the specific computing device.

9. The method of claim 1, wherein assigning the task includes pushing the task to the specific computing device with the highest priority score.

10. The method of claim 1, wherein the method further includes calculating one or more priority scores for additional tasks in the oldest portion of the queue.

11. The method of claim 1, wherein calculating the priority score for the task further comprises:

calculating a resource requirement cost wherein the resource requirement cost comprises a cost of an amount of resources required to process the task; and evaluating the resource requirement cost determine the priority score.

12. A computer system comprising:

a processor, a memory in communication with the processor and an input/output circuit, the processor being physically configured to execute a computer executed method of efficiently selecting a task from a queue of tasks to be executed in a distributed computing environment by a specific computing device in a plurality of computing devices, the method comprising:

reading a summary of the task in the queue of tasks to be executed by one of the plurality of computing devices in a cloud of processors;

calculating a new function cost for the specific computing device wherein the new function cost comprises a cost to switch from one function to another function required by the task in the queue;

calculating a deployment cost for the specific computing device wherein the deployment cost comprises a cost of deploying an additional function required by the task in the queue;

calculating a switching cost for the specific computing device wherein the switching cost comprises a cost of switching from a last executed function to a newly deployed function required by the task in the queue;

calculating a wait cost for the specific computing device wherein the wait cost comprises a cost of leaving the task in the queue;

calculating a resource requirement cost wherein the resource requirement cost comprises a cost of an amount of resources required to process the task;

evaluating the new function cost, the deployment cost, the wait cost and the resource requirement cost to determine a priority score for the task on the specific computing device wherein the priority score comprises an indication of a relative priority of the task in comparison to additional tasks in the queue; and based on the priority score, selecting the task with a highest priority to be a next executed task by the specific computing device.

13. The computer system of claim 12, further comprising computer executable code for executing an existing task while deploying another task within the specific computing device.

14. The computer system of claim 12, further comprising computer executable code for executing multiple tasks simultaneously within the specific computing device.

15. The computer system of claim 12, wherein if an existing task does not fully consume a specific computing device resource, the computer system further includes computer executable code for initiating additional tasks in the specific computing device.

16. The computer system of claim 12, wherein the task with a highest priority score for the specific computing device is pushed to the specific computing device.

17. The computer system of claim 12, wherein a portion of the queue is evaluated, and wherein the portion is the oldest portion of the queue.

18. A non-transitory computer storage medium that is physically configured to contain computer executable instructions for efficiently selecting a task from a queue of tasks to be executed in a distributed computing environment by a specific computing device in a plurality of computing devices, the method comprising:

reading a summary of the task in the queue of tasks to be executed by one of the plurality of computing devices in a cloud of processors;

calculating a new function cost for the specific computing device wherein the new function cost comprises a cost to switch from one function to another function required by the task in the queue;

calculating a deployment cost for the specific computing device wherein the deployment cost comprises a cost of deploying an additional function required by the task in the queue;

calculating a switching cost for the specific computing device wherein the switching cost comprises a cost of switching from a last executed function to a newly deployed function required by the task in the queue;

calculating a wait cost for the specific computing device wherein the wait cost comprises a cost of leaving the task in the queue;

calculating a resource requirement cost wherein the resource requirement cost comprises a cost of an amount of resources required to process the task for the specific computing device; and evaluating the new function cost, the deployment cost, the wait cost and the resource requirement cost to determine a priority score for the task on the specific computing device wherein the priority score comprises an indication of a relative priority of the task in comparison to additional tasks in the queue; and based on the priority score, selecting the task with a highest priority to be a next executed task by the specific computing device.

19. The computer storage medium of claim 18, further comprising computer executable code for executing an existing task while deploying another task within the specific computing device.

20. The computer storage medium of claim 18, further comprising computer executable code for executing multiple tasks simultaneously within the specific computing device.

* * * * *